US012531295B2

(12) United States Patent
Osaki

(10) Patent No.: US 12,531,295 B2
(45) Date of Patent: Jan. 20, 2026

(54) EXTERIOR BODY AND METHOD FOR MANUFACTURING THE SAME

(71) Applicant: HONDA MOTOR CO., LTD., Tokyo (JP)

(72) Inventor: Kanae Osaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 653 days.

(21) Appl. No.: 17/823,961

(22) Filed: Sep. 1, 2022

(65) Prior Publication Data

US 2023/0099240 A1    Mar. 30, 2023

(30) Foreign Application Priority Data

Sep. 29, 2021    (JP) ................. 2021-159055

(51) Int. Cl.
| | | |
|---|---|---|
| *H01M 50/105* | (2021.01) | |
| *H01M 10/058* | (2010.01) | |
| *H01M 50/119* | (2021.01) | |
| *H01M 50/121* | (2021.01) | |
| *H01M 50/129* | (2021.01) | |

(52) U.S. Cl.
CPC ....... *H01M 50/105* (2021.01); *H01M 10/058* (2013.01); *H01M 50/119* (2021.01); *H01M 50/121* (2021.01); *H01M 50/129* (2021.01)

(58) Field of Classification Search
CPC .................................................. H01M 50/105
See application file for complete search history.

(56) References Cited

U.S. PATENT DOCUMENTS

2018/0175337 A1    6/2018    Lee et al.

FOREIGN PATENT DOCUMENTS

| | | | |
|---|---|---|---|
| JP | 2011258438 A | 12/2011 | |
| JP | 2012169204 A | 9/2012 | |
| JP | 2018526769 A | 9/2018 | |
| JP | 2019046741 A | 3/2019 | |
| JP | 2020092062 A | 6/2020 | |
| WO | WO-2013191125 A1 * | 12/2013 | ........ H01M 10/0525 |

OTHER PUBLICATIONS

Notification of Reasons for Refusal issued Nov. 26, 2024 in the JP Patent Application No. 2021-159055.

* cited by examiner

*Primary Examiner* — Brian R Ohara
(74) *Attorney, Agent, or Firm* — CKC & Partners Co., LLC

(57) ABSTRACT

To ensure the welding strength (the T-peel strength) of a welding portion. An exterior body 3 of the present invention houses a content. The exterior body 3 has a welding portion 55 extending in a first direction X. At the welding portion 55, portions of a planar body or planar bodies (e.g., portions of a laminated film 3f or laminated films 3f) are welded so as to overlap with each other in a second direction Y perpendicular to the first direction X, the planar body or the planar bodies being the material of the exterior body 3. In a sectional view as viewed in a third direction Z perpendicular to the first direction X and the second direction Y, the welding portion 55 has, at an end portion on a content side, curved portions 58 recessed in a curved shape toward the side opposite to the content side.

6 Claims, 8 Drawing Sheets

[COMPARATIVE EXAMPLE]

[PRESENT EMBODIMENT]

EXTERIOR BODY AND METHOD FOR MANUFACTURING THE SAME

This application is based on and claims the benefit of priority from Japanese Patent Application No. 2021-159055, filed on 29 Sep. 2021, the content of which is incorporated herein by reference.

BACKGROUND OF THE INVENTION

Field of the Invention

The present invention relates to an exterior body housing a solid-state battery or the like as a content.

Related Art

In recent years, EVs, HEVs, etc. have become popular in consideration of reducing adverse effects on the environment, etc. For example, as a battery used for these vehicles, a laminated cell type battery (e.g., Japanese Unexamined Patent Application, Publication No. 2012-169204) has been known, in which a rectangular parallelepiped power generation element (cell) is wrapped with an exterior body such as a laminated film and is sealed in a plate shape. Specifically, for EVs, HEVs, etc., a battery pack has been used, in which a plurality of laminated cell type batteries as described above is arranged and housed in a case.

Patent Document 1: Japanese Unexamined Patent Application, Publication No. 2012-169204

SUMMARY OF THE INVENTION

Preferably, in a case where laminated film edge portions are welded to each other, an end portion of a welding portion on a content (power generation element) side is, in a sectional view, formed not in a shape recessed at an acute angle but in a shape recessed at an obtuse angle, considering welding strength. However, in a case where laminated films having certain length and width are welded to each other, it is difficult to form, in a uniform manner from the start, an end portion of a welding portion on a content side in an obtuse-angled shape as intended due to the influence of thermal expansion of a heat seal bar for welding, distortion of the heat seal bar, an error in the thickness of the laminated film, or the like. For this reason, a portion recessed at an acute angle might be formed at the end portion of the welding portion on the content side.

In this case, the welding strength (T-peel strength) is reduced starting from the portion recessed at the acute angle, and therefore, cracks might occur at the welding portion. Accordingly, sealability is reduced, leading to the entrance of gas or the like into the exterior body.

Specifically, the case where the portion recessed at the acute angle is formed at the end portion of the welding portion on the content side may include the following two cases, for example. The first case is a case where one portion recessed at the acute angle toward the side opposite to the content side is merely formed at the end portion of the welding portion on the content side. The second case is a case where molten resin projects to form a resin lump (an agglomeration of resin) protruding from the end portion of the welding portion on the content side to the content side, and on each side of the resin lump, the portion recessed at the acute angle toward the side opposite to the content side is formed.

In the case where the portion recessed at the acute angle is formed as described above, for example, at a low temperature state in which the resin becomes hard, cracks may occur starting from the portion recessed at the acute angle even if these cracks do not lead to rupture. In a subsequent normal-to-high temperature (a temperature exceeding a glass-transition point) state, the welding strength may be reduced. This is because once cracks or the like occur under a low-temperature environment, the welding strength is reduced due to these cracks or the like even in the subsequent normal-to-high temperature state.

The present invention has been made in view of the above-described situation, and an object of the present invention is to ensure the welding strength (the T-peel strength) of the welding portion.

The inventor(s) of the present invention has focused on a point that if the welding portion of the exterior body has, at the end portion on the content side, a curved portion recessed in a curved shape toward the side opposite to the content side as viewed in a sectional view, crevices or cracks are less likely to occur as compared to the case where the welding portion has the acute-angled portion recessed at the acute angle, and has arrived at the present invention. The present invention relates to aspects (1) to (8) of an exterior body and aspects (9) to (12) of an exterior body manufacturing method below.

(1) An exterior body housing a content, including a welding portion at which portions of a planar body or planar bodies are welded so as to overlap with each other in a second direction perpendicular to a first direction and which extends in the first direction, the planar body or the planar bodies being a material of the exterior body.

In a sectional view as viewed in a third direction perpendicular to the first direction and the second direction, the welding portion has, at an end portion on a content side, a curved portion recessed in a curved shape toward the side opposite to the content side.

According to aspect (1), the welding portion has the curved portion at the end portion on the content side, and therefore, cervices or cracks are less likely to occur as compared to a case where the welding portion has an acute-angled portion. Thus, the welding strength of the welding portion can be ensured.

(2) The exterior body according to (1), in which an end of the welding portion in the second direction extends in the first direction, and as viewed in the sectional view, the curved portion is on an extension of the end.

According to aspect (2), the welding strength of the welding portion can be ensured as compared to a case where the acute-angled portion is on the extension.

(3) The exterior body according to (1) or (2), in which the end of the welding portion in the second direction extends in the first direction, and as viewed in the sectional view, the curved portion is on a side farther from the welding portion in the second direction with respect to the extension of the end.

According to aspect (3), the welding strength of the welding portion can be ensured as compared to a case where the acute-angled portion is on a side farther from the welding portion in the second direction with respect to the extension.

(4) The exterior body according to any one of (1) to (3), in which both ends of the welding portion in the second direction extend in the first direction, and as viewed in the sectional view, the curved portion is in the curved shape so as to extend over extensions of the both ends in the second direction.

According to aspect (4), the welding strength of the welding portion can be ensured as compared to a case where the acute-angled portion extends over the extensions of the both ends in the second direction.

(5) The exterior body according to any one of (1) to (3), in which the welding portion has, in the sectional view as viewed in the third direction, a resin lump protruding from the end portion on the content side to the content side, and the curved portion is on each side of the resin lump in the second direction.

According to aspect (5), the welding strength of the welding portion can be ensured as compared to a case where the acute-angled portion is on each side of the resin lump in the second direction.

(6) The exterior body according to any one of (1) to (5), in which the planar body or each of the planar bodies is a laminated film having an outer resin layer, a metal layer, and an inner resin layer, and portions of the inner resin layer or the inner resin layers are welded to each other at the welding portion.

According to aspect (6), the welding strength of the welding portion at which the portions of the inner resin layer of the laminated film or the inner resin layers of the laminated films are welded to each other can be ensured.

(7) The exterior body according to any one of (1) to (6), in which the content is a power generation element.

(8) The exterior body according to (7), in which the power generation element includes a solid-state battery having a solid electrolyte.

Some power generation elements (particularly, solid-state batteries) expand upon charging and contract upon discharging, for example. For this reason, the welding portion is susceptible to damage. On this point, according to aspects (7) and (8), aspect (1) capable of ensuring the welding strength can be more effectively utilized.

(9) A method for manufacturing an exterior body housing a content, including a welding step of welding portions of a planar body or planar bodies with the portions of the planar body or the planar bodies overlapping with each other in a second direction perpendicular to a first direction, thereby forming a welding portion extending in the first direction, the planar body or the planar bodies being a material of the exterior body, and a pulling step of applying external force to the planar body or the planar bodies such that an end portion of the welding portion on a content side is pulled to both sides in the second direction more strongly than that in a finished state of the exterior body.

According to aspect (9), even in a case where an acute-angled portion recessed at an acute angle toward the side opposite to the content side is formed at the end portion of the welding portion on the content side in the welding step, the acute-angled portion is rounded by the pulling step so that a curved portion recessed in a curved shape can be formed. With this configuration, crevices or cracks are less likely to occur as compared to a state in which the acute-angled portion remains, and the welding strength of the welding portion can be ensured.

(10) The method for manufacturing the exterior body according to (9), in which in the pulling step, the external force is applied under a situation where the end portion of the welding portion on the content side is at a temperature exceeding the glass-transition point of resin forming the welding portion.

According to aspect (10), resin is softened at the end portion of the welding portion on the content side, and therefore, the acute-angled portion is easily rounded.

(11) The method for manufacturing the exterior body according to (9) or (10), in which in the pulling step, the external force is applied by expansion of the content by heating.

According to aspect (11), the content is expanded by heating so that the end portion of the welding portion on the content side can be pulled to both sides in the second direction.

(12) The method for manufacturing the exterior body according to (9) or (10), in which in the pulling step, the external force is applied by the pressure of gas injected to an inner side of the welded planar body or the welded planar bodies.

According to aspect (12), the end portion of the welding portion on the content side can be pulled to both sides in the second direction from the inside by the gas pressure.

As described above, according to the present invention, crevices or cracks can be reduced by the curved portion at the end portion of the welding portion on the content side, and the welding strength (the T-peel strength) of the welding portion can be ensured.

DETAILED DESCRIPTION OF THE INVENTION

Hereinafter, embodiments of the present invention will be described with reference to the drawings. Note that the present invention is not limited to the embodiments below and changes can be made as necessary without departing from the gist of the present invention.

First Embodiment

Figure 1:
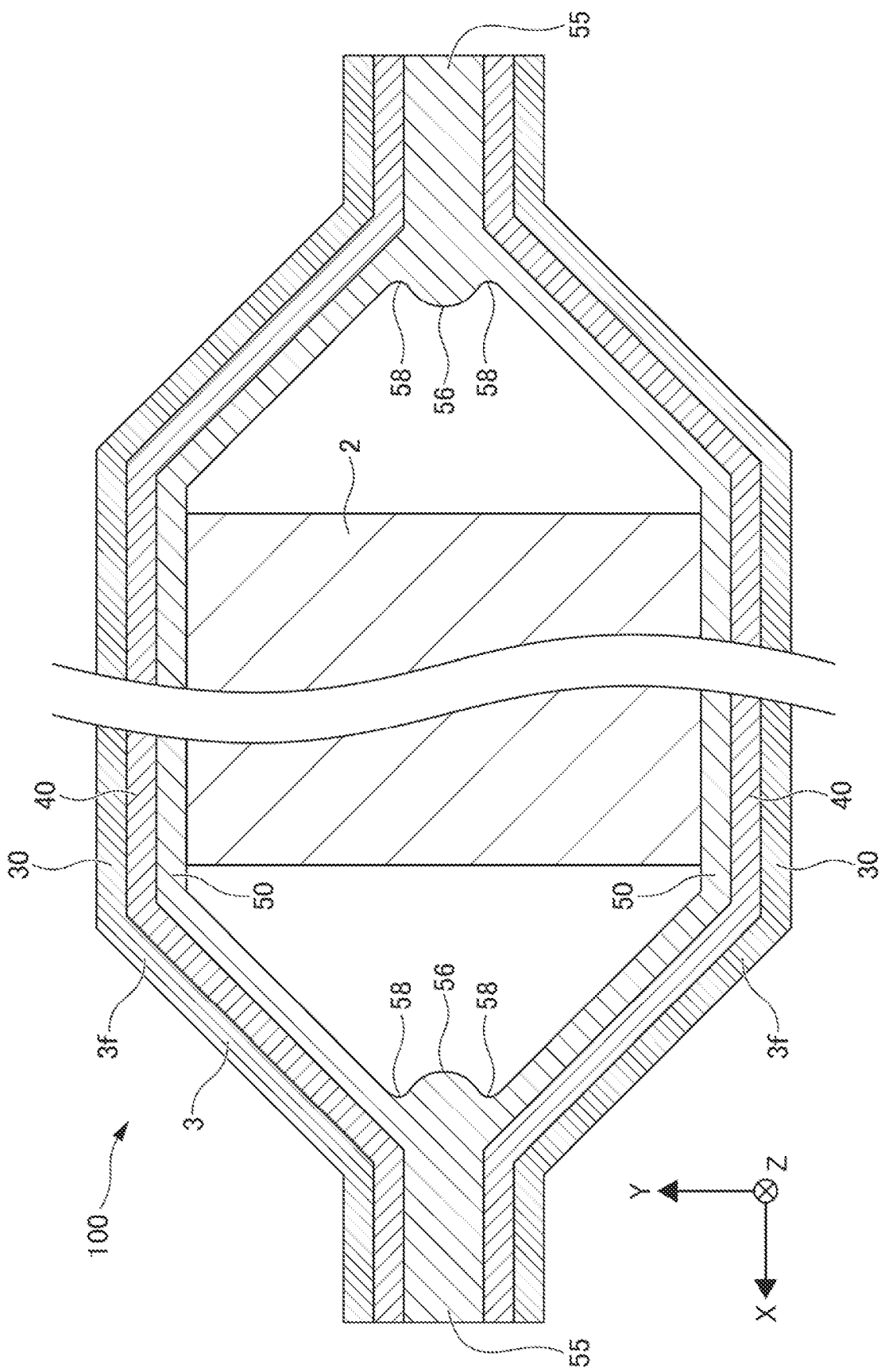
FIG. 1 is a sectional view showing an exterior body of a first embodiment.

FIG. 1 is a sectional view showing an exterior body 3 of a first embodiment. The exterior body 3 houses a power generation element 2 as a content. The power generation element 2 has a plurality of solid-state batteries as batteries including a solid electrolyte. The exterior body 3 may be, for example, formed in such a manner that a single laminated film 3*f* is folded and edge portions thereof are welded to each other or edge portions of two laminated films 3*f* are welded to each other. The power generation element 2 and the exterior body 3 form a laminated cell type battery 100.

Hereinafter, a thickness direction of the laminated cell type battery 100 will be referred to as a "second direction Y", a predetermined direction perpendicular to the second direction Y will be referred to as a "first direction X", and a direction perpendicular to the first direction X and the second direction Y will be referred to as a "third direction Z".

The laminated film 3*f* has a heat-resistant outer resin layer 30, a metal layer 40, and a thermoplastic inner resin layer 50. Thus, the melting point of resin forming the inner resin layer 50 is lower than the melting point of resin forming the outer resin layer 30. The exterior body 3 has, at edge portions thereof, welding portions 55 extending in the first direction X and the third direction Z. At the welding portion 55, portions of the laminated film 3*f* or the laminated films 3*f* are welded so as to be stacked on each other in the second direction Y with portions of the inner resin layer 50 or the inner resin layers 50 facing each other.

Figure 2:
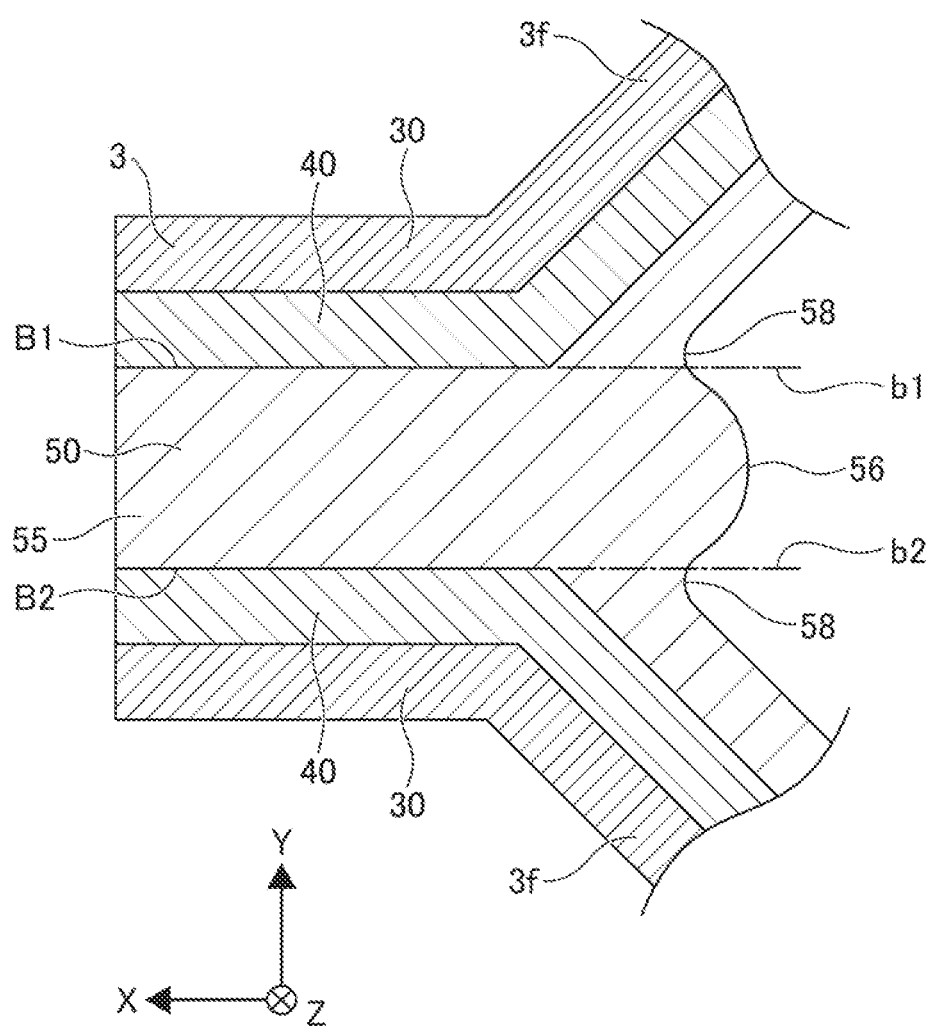
FIG. 2 is an enlarged view of a welding portion of the exterior body of FIG. 1 and the periphery thereof.

FIG. 2 is an enlarged view of the welding portion 55 of the exterior body 3 of FIG. 1 and the periphery thereof. The welding portion 55 has, in a section as viewed in the third direction Z, a resin lump 56 protruding from an end portion on a power generation element 2 side toward the power generation element 2 side, and on both sides of the resin lump 56 in the second direction Y, has curved portions 58 recessed in a curved shape toward the side opposite to the power generation element 2 side.

Next, a specific position of the curved portion 58 in the second direction Y will be described. In the section as viewed in the third direction Z, each end of the welding portion 55 in the second direction Y is a boundary B1, B2 between the inner resin layer 50 and the metal layer 40, and extends in the first direction X. Specifically, two boundaries B1, B2 extend, with a substantially constant interval between the boundaries B1, B2, substantially parallel with each other from an end portion of the welding portion 55 on the side opposite to the power generation element 2 side to immediately before the end portion of the welding portion 55 on the power generation element 2 side. The curved portion 58 is on an extension b1, b2 of the boundary B1, B2 or on a side farther from the welding portion 55 in the second direction Y with respect to the extension b1, b2.

Next, the method for manufacturing the exterior body 3 described above will be described with reference to FIGS. 3 and 4. The manufacturing method includes a welding step and a subsequent pulling step.

Figure 3:
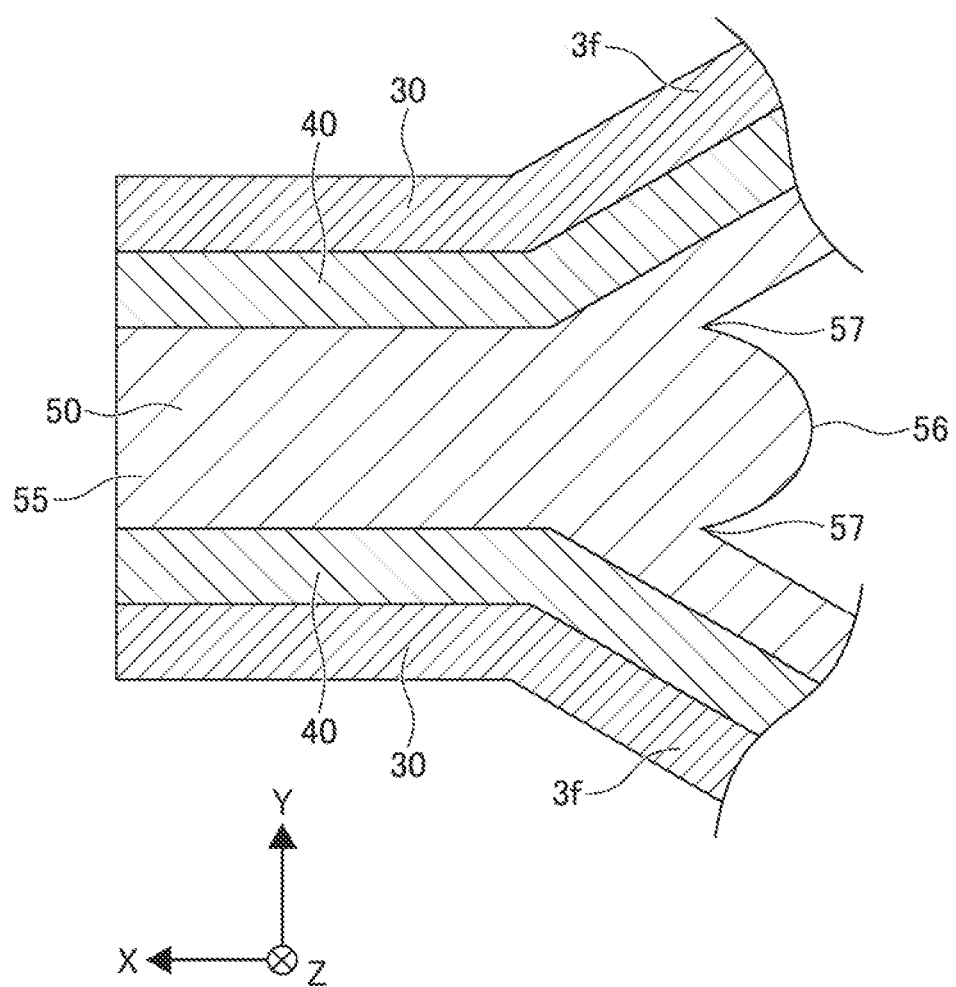
FIG. 3 is a sectional view showing the exterior body after a welding step.

FIG. 3 is a sectional view showing, in the third direction Z, the welding portion 55 after the welding step. In the welding step, in a state in which the power generation element 2 is housed inside the laminated film(s) 3*f*, the edge portions of the laminated film(s) 3*f* overlap with each other in the second direction Y such that the portions of the inner resin layer. 50 (or the inner resin layers 50) face each other. These overlapping portions are heated and pressurized using, for example, a heating tool (a heat seal bar) from both sides in the second direction Y. In this manner, the portions of the inner resin layer 50 (or the inner resin layers 50) are welded to each other, thereby forming the welding portion 55. At this point, molten resin projects to form the resin lump 56 protruding from the end portion of the welding portion 55 on the power generation element 2 side to the power generation element 2 side in the section as viewed in the third direction Z. On both sides of the resin lump 56 in the second direction Y, acute-angled portions 57 recessed at an acute angle toward the side opposite to the power generation element 2 side are formed.

Figure 4:
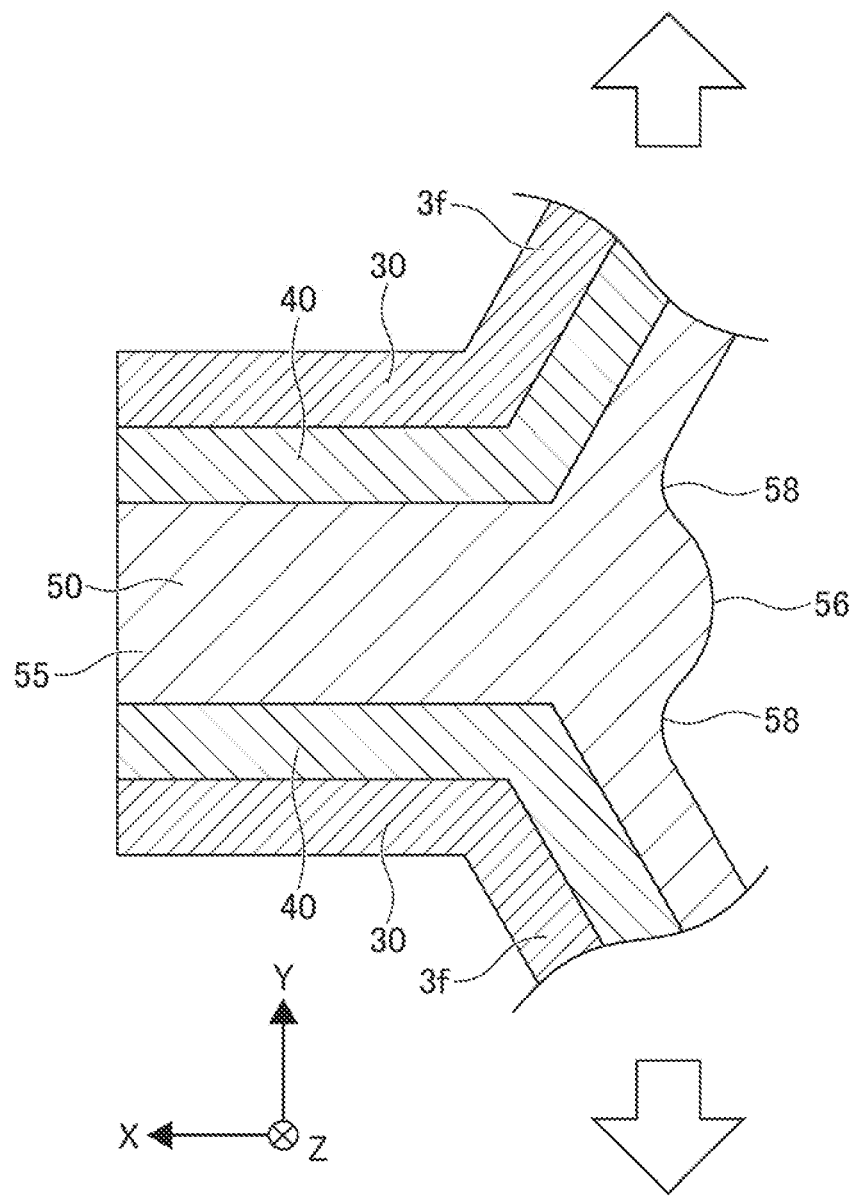
FIG. 4 is a sectional view showing the exterior body in a pulling step.

FIG. 4 is a sectional view showing, in the third direction Z, the welding portion 55 in the pulling step. In the pulling step, at least the end portion of the welding portion 55 on the power generation element 2 side is, by a heater or the like, first heated to a temperature exceeding the glass-transition point (e.g., 0° C.) of resin forming the welding portion 55 (i.e., resin forming the inner resin layer 50).

Next, under such a situation, external force is applied to the laminated film(s) 3*f*. By such external force, the end portion of the welding portion 55 on the power generation element 2 side is strongly pulled to both sides in the second direction Y as compared to a finished state of the exterior body 3. That is, the end portion of the welding portion 55 is pulled to both sides in the second direction Y with stronger force than a force of pulling such an end portion to both side in the second direction Y due to the power generation element 2 housed inside the exterior body 3. Such external pulling force can be, for example, applied in such a manner that portions of the laminated film(s) 3*f* positioned on both sides of the welding portion 55 in the second direction Y are held and such held portions are pulled to both sides in the second direction Y. Alternatively, the external force can be applied in such a manner that the content (the power generation element 2) is heated to a higher temperature and is expanded in an intended manner, for example. Alternatively, the external force can be applied by the pressure of gas injected to an inner side formed by the laminated film(s) 3*f* welded at the edge portions, for example. The acute-angled portions 57 shown in FIG. 3 are rounded by the external force (pulling), and the curved portions 58 shown in FIG. 4 are formed.

Note that in this pulling step, the external force is applied under the situation where the end portion is at the temperature exceeding the glass-transition point because resin forming such an end portion is softened. In this manner, the acute-angled portions 57 can be rounded without any crack (whitening) or the like, and the curved portions 58 can be formed accordingly. Specifically, such a temperature is, for sufficiently softening resin forming the end portion, preferably equal to or higher than a normal temperature and more preferably equal to or higher than 60° C. Note that there is a problem that the inner resin layer 50 becomes too soft if the temperature is too high, and for this reason, the temperature is preferably equal to or lower than the melting point (e.g., 140° C.) of resin forming the inner resin layer 50, more preferably equal to or lower than 90° C., and much more preferably equal to or lower than 60° C.

In the pulling step, the force of pulling the end portion to both sides in the second direction Y is, for sufficiently rounding the acute-angled portions 57, preferably equal to or greater than 20 N, more preferably equal to or greater than 40 N, and much more preferably equal to or greater than 60 N. Note that there is a probability that the welding portion 55 is, for example, damaged if the pulling force is too strong, and for this reason, the pulling force is preferably equal to or less than the yield point of the laminated film 3*f*, and specifically, is preferably equal to or less than the 0.2% proof stress of the metal layer 40. After the pulling step, the pulling force is removed, and accordingly, the state shown in FIG. 2 results.

In the present embodiment, the power generation element 2 (the solid-state batteries) housed inside the exterior body 3 expands upon charging, and contracts upon discharging. Thus, the welding portion 55 is susceptible to damage such as crevices or cracks. Even in a case where gas is accumulated in a space between the exterior body 3 and the power generation element 2, the welding portion 55 is susceptible to damage such as crevices or cracks due to the pressure of such gas. Damage such as crevices or cracks easily occurs at a low temperature (particularly, equal to or lower than the glass-transition point) at which resin is hardened. On this point, in the pulling step of the present embodiment, the end portion of the welding portion 55 on the power generation element 2 side is pulled to both side in the second direction Y under the situation where the temperature exceeds the glass-transition point. In this manner, the acute-angled portions 57 formed at the end portion are rounded to form the curved portions 58. Thus, as compared to a state in which the acute-angled portions 57 remain, crevices or cracks are less likely to occur at the welding portion 55, and the welding strength of the welding portion 55 can be improved. Consequently, the highly-durable laminated cell type battery 100 can be provided.

Second Embodiment

Next, a second embodiment will be described. In the present embodiment, differences from the first embodiment will be mainly described, and description of contents identical or similar to those of the first embodiment will be omitted as necessary.

Figure 5:
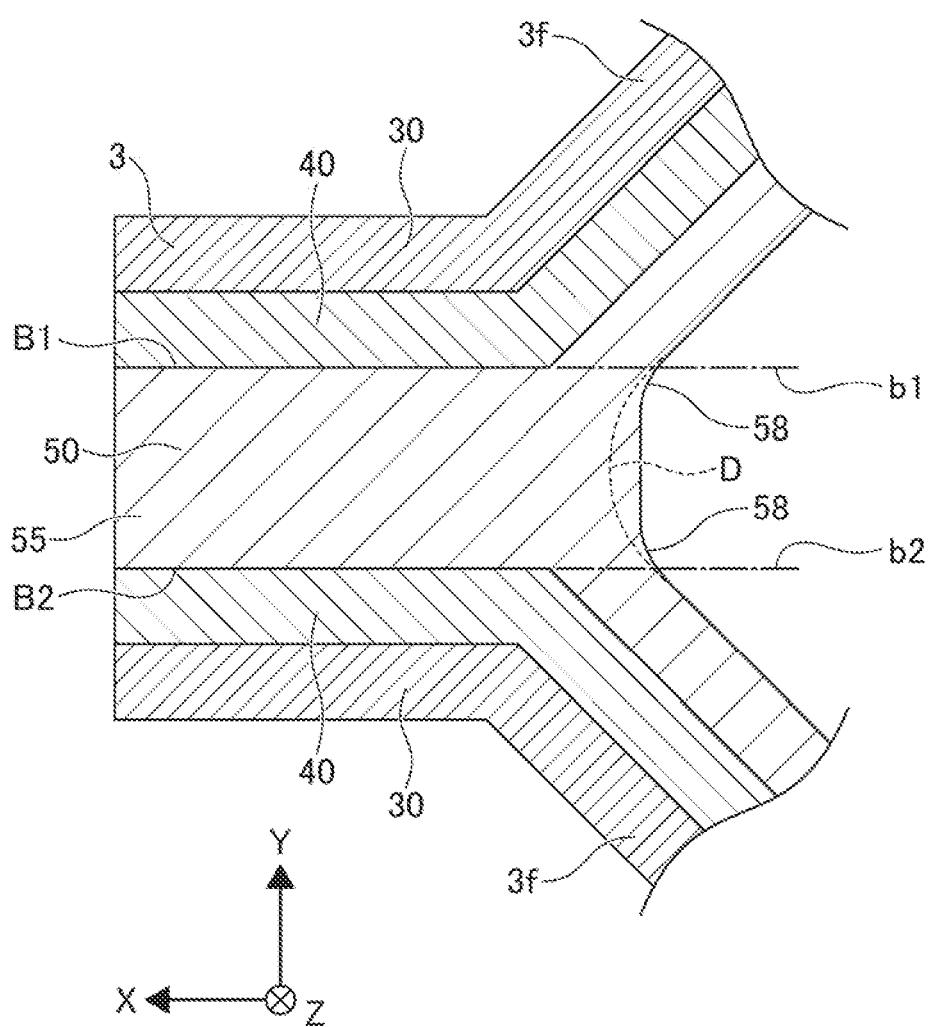
FIG. 5 is a sectional view of a welding portion of an exterior body of a second embodiment and the periphery thereof.

FIG. 5 is a sectional view showing, in the third direction Z, a welding portion 55 of an exterior body 3 of the present embodiment. In the present embodiment, the welding portion 55 has no resin lump 56 at an end portion on a power generation element 2 side.

Note that in FIG. 5, a portion positioned between two curved portions 58 at the end portion of the welding portion 55 on the power generation element 2 side extends linearly in the second direction Y, but may be recessed in a curved shape as indicated by a dashed line D, for example. That is, the curved portions 58 may be, in a section as viewed in the third direction Z, in the curved shape so as to continuously extend over two extensions b1, b2 in the second direction Y.

Figure 6:
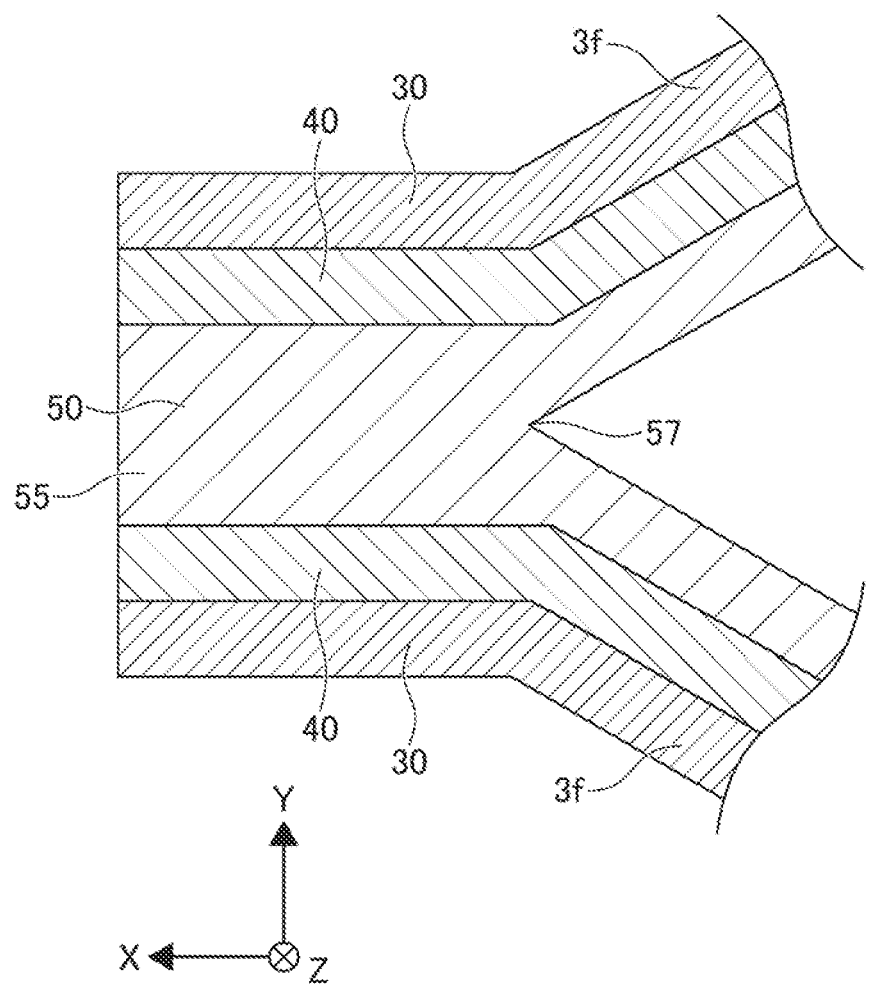
FIG. 6 is a sectional view showing the exterior body after a welding step.

FIG. 6 is a sectional view showing, in the third direction Z, the welding portion 55 after a welding step. In the welding step of the present embodiment, molten resin does not project to the power generation element 2 side. Thus, no resin lump 56 is formed at the end portion of the welding portion 55 on the power generation element. 2 side. Accordingly, in the sectional view as viewed in the third direction 2, an acute-angled portion 57 recessed at an acute angle toward the side opposite to the power generation element 2 side is formed at a center portion of the end portion in the second direction Y.

Figure 7:
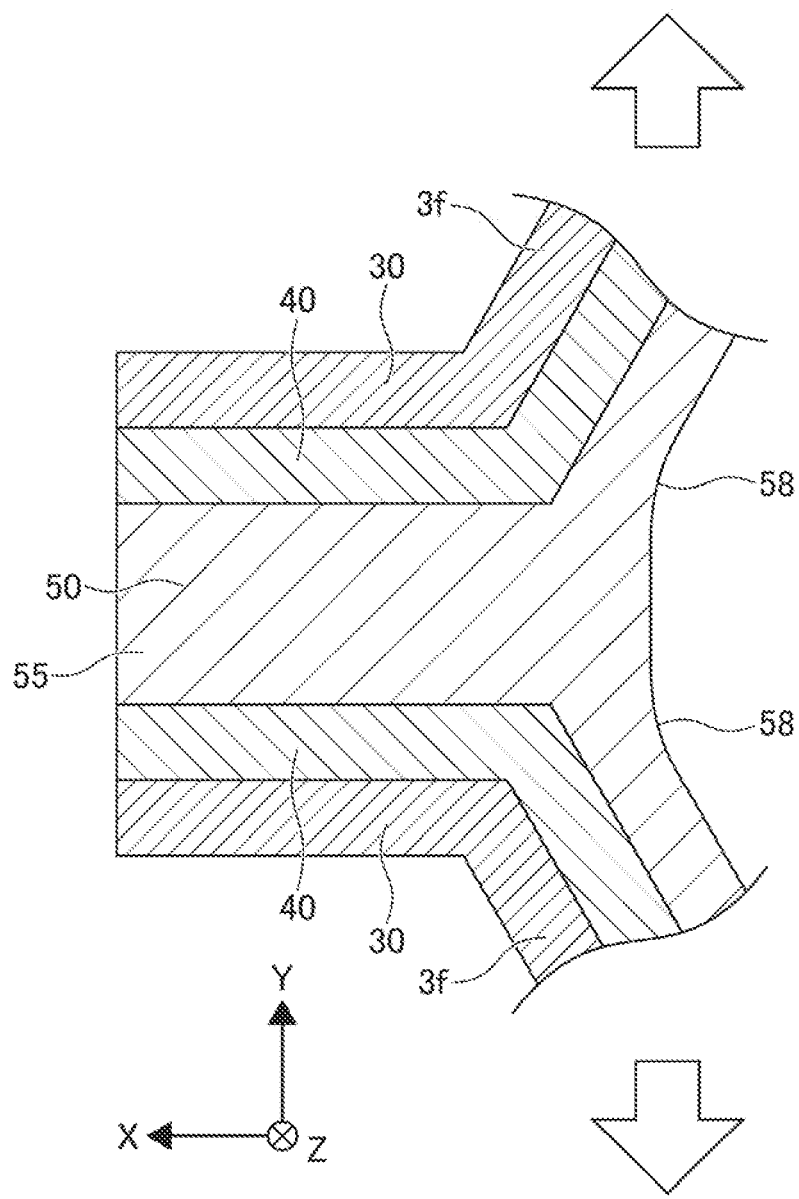
FIG. 7 is a sectional view showing the exterior body in a pulling step.

FIG. 7 is a sectional view showing, in the third direction Z, the welding portion 55 in a pulling step. By external force in the pulling step, the acute-angled portion 57 shown in FIG. 6 is rounded, thereby forming the curved portions 58. After the pulling step, the external force is removed, and accordingly, the state shown in FIG. 5 results.

According to the present embodiment, even in a case where no resin lump 56 is formed at the welding portion 55, advantageous effects (improvement in welding strength) similar to those of the first embodiment can be produced. Hereinafter, the advantageous effects of the present embodiment will be specifically described. Hereinafter, an exterior body 3 manufactured without the above-described pulling step, i.e., an exterior body 3 formed with the acute-angled portion 57 shown in FIG. 6, will be referred to as an "exterior body 3 of a comparative example".

Figure 8:
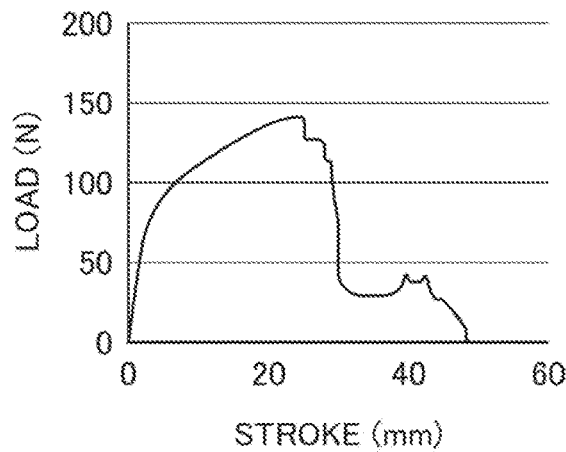
FIG. 8 is a graph showing a relationship between a pulling force (a load) and a stretch (a stroke) in a case where an exterior body of a comparative example is pulled under a normal temperature.

FIG. 8 shows a case where the welding portion 55 of the exterior body 3 of the comparative example is pulled to both sides in the second direction Y under a situation of a normal temperature (23° C.). The vertical axis indicates a force (a load) of pulling to both sides in the second direction Y, and the horizontal axis indicates a stretch (a stroke) of the exterior body 3 in the second direction Y. FIG. 8 shows that under the situation of the normal temperature (23° C.), the welding portion 55 is destroyed (broken down) when pulled to both sides in the second direction Y with a force of slightly less than 150 N.

Figure 9:
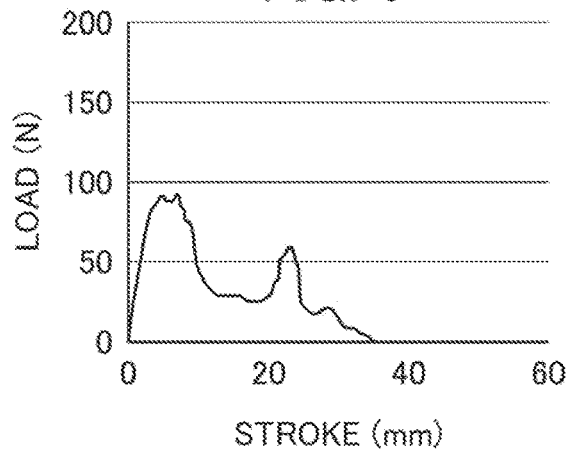
FIG. 9 is a graph showing a relationship between a pulling force (a load) and a stretch (a stroke) in a case where the exterior body of the comparative example is pulled under a low temperature and is subsequently pulled under the normal temperature.

FIG. 9 shows a case where the welding portion 55 of the exterior body 3 of the comparative example is pulled once to both sides in the second direction Y with 40 N under a situation of a low temperature (−30° C.), and thereafter, is pulled to both sides in the second direction Y under the situation of the normal temperature (23° C.) as in the case of FIG. 8. FIG. 9 shows that the welding portion 55 is damaged by pulling performed first under the low temperature (−30° C., 40 N), and for this reason, is destroyed with a force (slightly less than 100 N) weaker than that in the case of FIG. 8 (slightly less than 150 N) under the subsequent situation of the normal temperature (23° C.).

Figure 10:
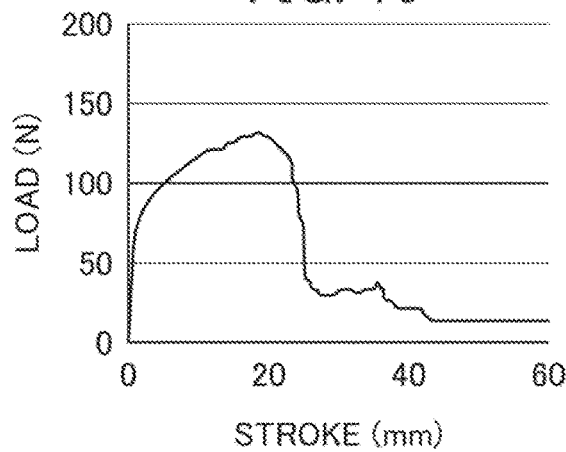
FIG. 10 is a graph showing a relationship between a pulling force (a load) and a stretch (a stroke) in a case where the exterior body of the present embodiment is pulled under the low temperature and is subsequently pulled under the normal temperature.

FIG. 10 shows a case where the welding portion 55 of the exterior body 3 of the present embodiment is, as in the case of FIG. 9, pulled once to both sides in the second direction Y with 40 N under the situation of the low temperature (−30° C.), and thereafter, is pulled to both sides in the second direction Y under the situation of the normal temperature (23° C.). FIG. 10 shows that the welding portion 55 is little damaged by pulling performed first under the low temperature (−30° C., 40 N), and for this reason, is not destroyed under the subsequent situation of the normal temperature (23° C.) until a force (slightly less than 150 N) substantially equal to that in the case of FIG. 8 (slightly less than 150 N) is applied.

As described above, it has been confirmed that the welding portion 55 of the present embodiment is less likely to be destroyed as compared to the welding portion 55 of the comparative example, i.e., the welding strength is improved when the curved portions 53 are formed by rounding of the acute-angled portions 57.

EXPLANATION OF REFERENCE NUMERALS

2 Power Generation Element (Content)
3 Exterior Body
3f Laminated Film (Planar Body as Material of Exterior Body)
30 Outer Resin Layer of Laminated Film
40 Metal Layer of Laminated Film
50 Inner Resin Layer of Laminated Film
55 Welding Portion
56 Resin Lump
57 Acute-Angled Portion
58 Curved Portion
100 Laminated Cell Type Battery
B1 Boundary between Inner Resin Layer and Metal Layer (End of Welding Portion in Second Direction)
B2 Boundary between Inner Resin Layer and Metal Layer (End of Welding Portion in Second Direction)
b1 Extension of Boundary
b2 Extension of Boundary X First Direction
Y Second Direction
Z Third Direction

What is claimed is:

1. A method for manufacturing an exterior body housing a content, comprising:
   a welding step of welding portions of a planar body or planar bodies with the portions of the planar body or the planar bodies overlapping with each other in a second direction perpendicular to a first direction, thereby forming a welding portion extending in the first direction, the planar body or the planar bodies being a material of the exterior body; and
   a pulling step of applying external force to the planar body or the planar bodies such that, prior to finishing of the exterior body, an end portion of the welding portion on a content side is pulled to both sides in the second direction more strongly than that in a finished state of the exterior body,
   wherein in a sectional view as viewed in a third direction perpendicular to the first direction and the second direction, at an end portion of the welding portion on the content side, a curved portion recessed in a curved shape toward a side opposite to the content side is formed by the external force.

2. The method for manufacturing the exterior body according to claim 1, wherein in the pulling step, the external force is applied under a situation where the end portion of the welding portion on the content side is at a temperature exceeding a glass-transition point of resin forming the welding portion.

3. The method for manufacturing the exterior body according to claim 1, wherein in the pulling step, the external force is applied by expansion of the content by heating.

4. The method for manufacturing the exterior body according to claim 1, wherein in the pulling step, the external force is applied by a pressure of gas injected to an inner side of the welded planar body or the welded planar bodies.

5. A method for manufacturing an exterior body housing a content, comprising:
   a welding step of welding portions of a planar body or planar bodies with the portions of the planar body or the planar bodies overlapping with each other in a second direction perpendicular to a first direction, thereby forming a welding portion extending in the first direction, the planar body or the planar bodies being a material of the exterior body; and
   a pulling step of applying external force to the planar body or the planar bodies such that an end portion of the welding portion on a content side is pulled to both sides in the second direction more strongly than that in a finished state of the exterior body,
   wherein in the pulling step, the external force is applied under a situation where the end portion of the welding portion on the content side is at a temperature exceeding a glass-transition point of resin forming the welding portion.

6. A method for manufacturing an exterior body housing a content, comprising:
   a welding step of welding portions of a planar body or planar bodies with the portions of the planar body or the planar bodies overlapping with each other in a second direction perpendicular to a first direction, thereby forming a welding portion extending in the first direction, the planar body or the planar bodies being a material of the exterior body; and
   a pulling step of applying external force to the planar body or the planar bodies such that an end portion of the welding portion on a content side is pulled to both sides in the second direction more strongly than that in a finished state of the exterior body,
   wherein in the pulling step, the external force is applied by expansion of the content by heating.

* * * * *